March 8, 1960 S. J. LIEVENSE ET AL 2,927,392
FISH LURE
Filed June 22, 1959
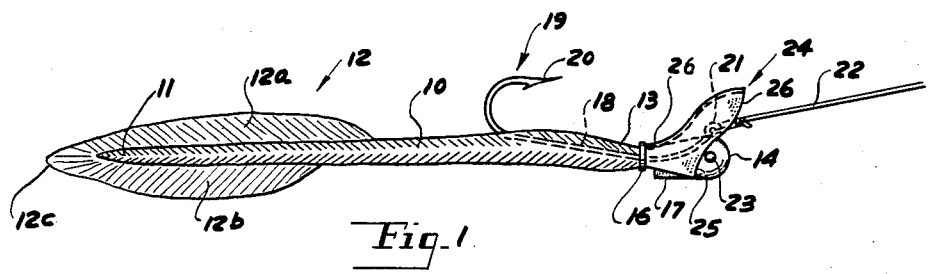
Fig. 1.
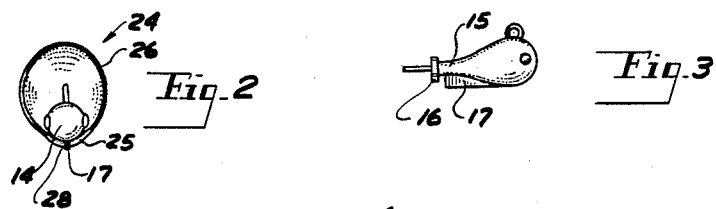
Fig. 2.
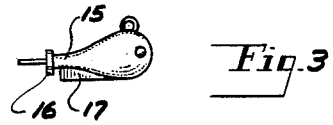
Fig. 3.
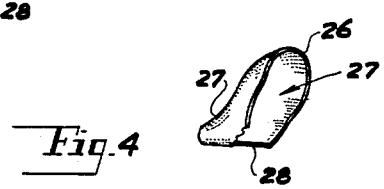
Fig. 4.
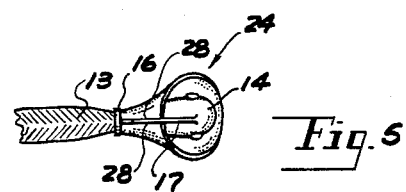
Fig. 5.
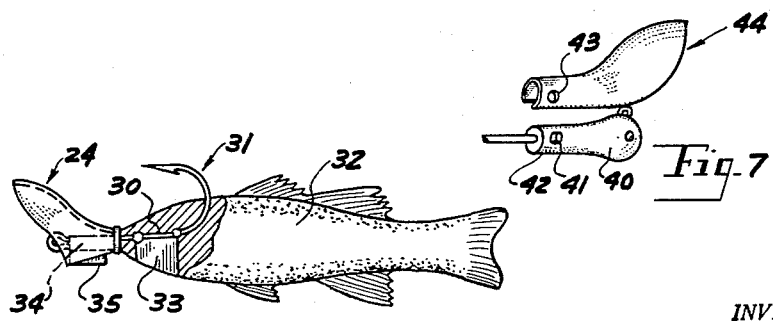
Fig. 7.
Fig. 6.
INVENTOR.
Stanley Lievense
and Charles I. Burke
by Louis Chayken
ATTORNEY

2,927,392
FISH LURE

Stanley J. Lievense and Charles I. Burke,
Traverse City, Mich.

Application June 22, 1959, Serial No. 822,035

1 Claim. (Cl. 43—42.39)

In general the invention pertains to a fish lure which has a body portion preferably made in a form simulating small live creatures such as minnows, crabs, worms, etc., and which is combined with turbulence scoop connected to but extending forwardly of the front portion of the lure.

The body of the lure contemplated herein is preferably one which is elongated and capable of sinuous twists longitudinally when drawn through water. The lure includes a fish hook which is partly imbedded in its body and which is weighed in such a manner that the center of gravity of the lure is below the level of the shank. The object of this arrangement is to keep the lure top side up in the course of its movement through water.

We shall now describe my lure with respect to the accompanying drawings in which:

Fig. 1 is a side elevational view of the lure including its turbulence scoop;

Fig. 2 is a front end of the lure including the scoop;

Fig. 3 is a side elevational view of the front member or head of the body of the lure to which the scoop is attached;

Fig. 4 is a perspective view of the scoop alone;

Fig. 5 is a bottom view of the scoop and a fragment of the body of the lure to which the scoop is attached;

Fig. 6 is a side elevational view of a fish lure with a modified mounting for the scoop;

Fig. 7 is a perspective view of a modified species of the scoop and a modified portion of the lure for support thereof.

The lure shown in Fig. 1 simulating an eel is made of a flexible resilient plastic material such as polyvinyl chloride, the body 10 of the lure being substantially circular in cross section but tapering to a pointed tail end 11. The latter includes a broad web 12 disposed vertically the web consisting of a portion 12a extending upwardly from the body of the lure, a portion 12b extending downwardly therefrom and a portion 12c extending rearwardly, all three portions being integrally connected to form a featherlike structure in which the tapered end portion 12 of the body of the lure resembles a quill.

At the front end 13 the lure includes a bulbous head 14 which is made of metal. The head includes a short stem 15 which is provided with an annular bead 16. Radially projecting from the underside of the head is a flat fin disposed in a vertical place as shown in Figs. 1 and 3.

Secured partly within the head 14 and imbedded partly in the front portion 13 of the body of the lure, is a shank 18 of a fish hook 19. The bill of the hook terminating with a barbed point 20, projects upwardly from the body of the lure while the opposite end of the hook terminates with an eyelet 21 for attachment to a fish line 22. Numeral 23 indicates simulated eyes of the fish lure.

Removably seated upon the head 14 is what may be called a turbulence scoop 24. It consists of a shell which in general has the form of an eccentric cone or funnel including an expanded front end forming a hood over the head 14 in eccentric relation thereto, the lower portion 25 of the hood being in contact with the undersurface of the head 14 while the upper portion 26 of the hood is arched over the head 14 leaving a shovel like cavity 27 as best shown in Fig. 4. In addition thereto the upper portion 26 of the hood projects forwardly beyond the limit of the lower portion 25. Rearwardly of the open front, the scoop tapers into a circular sleeve 26 which is of a sufficient diameter to embrace the short stem 15. The shell is split longitudinally at its lower portion, the split ends 28 being disposed in a resiliently yielding relation to each other. It is these ends which are in abutment with the fin 17, bearing at said rib from opposite sides as shown in Fig. 5. The rear end of the scoop bears against the bead 16 of the head 14.

Fig. 6 shows a modified species of the lure. The lure includes a hook 31 the shank 30 of the hook being partly imbedded in the body of said lure 32. A weight 33 which is also imbedded in the lure depends from said shank. A part of the shank of the lure projects outwardly of said body and carries a collar 34 which is provided with a radial fin 35, the fin being analogous to the fin 17 shown in Fig. 1. The scoop 24 is the same as shown in Fig. 1 and is applied to the shank 30 over the collar 34 in a manner analogous to that described with reference to the lure shown in Fig. 1.

Fig. 7 shows modified means of connecting a scoop to a supporting member equivalent to that shown in Fig. 1. Here, instead of having a fin 17 the supporting member such as the head 40, has a pair of diametrically proposed studs 41 projecting radially from the stem 42 of the head 40 while the scoop 44 has a pair of diametrically opposed apertures 43 for engagement with said studs.

It will be noted that in both species of the cone its axis is directed upwardly at an angle to the shank of the hook.

After having described my invention, I wish to claim the following:

A fish lure including, in combination, an elongated body, one end of which is the front portion thereof, a fish hook including a shank, the shank being partly imbedded in the body of the lure but extending forwardly thereof, a weight mounted on the shank and serving to lower the center of gravity of the lure to a point below the level of said shank, the weight being provided with a fin extending therefrom downwardly in a vertical plane, a turbulence scoop mounted upon said weight, the scoop including a cone open forwardly, the axis of the cone extending upwardly at an angle to said shank, said cone having a constricted end split longitudinally for engagement with the opposite sides of said fin.

References Cited in the file of this patent

UNITED STATES PATENTS

| 1,801,940 | Stanley | Apr. 21, 1931 |
| 2,005,554 | Milner | June 18, 1935 |
| 2,179,641 | Layfield | Nov. 14, 1939 |
| 2,218,280 | Deering | Oct. 15, 1940 |
| 2,382,595 | Wood | Aug. 14, 1945 |
| 2,462,828 | Parnell | Feb. 22, 1949 |